(12) United States Patent
Tiszai et al.

(10) Patent No.: US 9,528,510 B2
(45) Date of Patent: Dec. 27, 2016

(54) SELECTOR VALVE FOR SHORTENING MANAGEMENT SYSTEM

(75) Inventors: Joe Tiszai, Fairfield, OH (US); Craig Vagedes, Dayton, OH (US); Tim Landwehr, West Alexandria, OH (US)

(73) Assignee: Henny Penny Corporation, Eaton, OH (US)

( * ) Notice: Subject to any disclaimer, the term of this patent is extended or adjusted under 35 U.S.C. 154(b) by 2193 days.

(21) Appl. No.: 12/493,948

(22) Filed: Jun. 29, 2009

(65) Prior Publication Data

US 2010/0326288 A1 Dec. 30, 2010

(51) Int. Cl.
*A47J 37/12* (2006.01)
*F04B 41/02* (2006.01)

(52) U.S. Cl.
CPC ............ *F04B 41/02* (2013.01); *A47J 37/1223* (2013.01); *A47J 37/1266* (2013.01); *A47J 37/1285* (2013.01); *Y10T 137/0318* (2015.04); *Y10T 137/8225* (2015.04); *Y10T 137/85978* (2015.04); *Y10T 137/86389* (2015.04)

(58) Field of Classification Search
CPC .................................. A47J 37/12; A47J 37/00
USPC .................. 99/355, 352, 345, 348, 349, 330
See application file for complete search history.

(56) References Cited

U.S. PATENT DOCUMENTS

| | | | |
|---|---|---|---|
| 4,166,138 A * | 8/1979 | Ziminski et al. ............. | 426/249 |
| 4,502,373 A | 3/1985 | Keating | |
| 4,769,249 A * | 9/1988 | Webb ............................ | 426/438 |
| 5,244,370 A * | 9/1993 | DeMars ....................... | 425/72.1 |
| 5,301,847 A * | 4/1994 | Fehr et al. ..................... | 222/309 |
| 5,617,777 A | 4/1997 | Davis et al. | |
| 5,776,530 A | 7/1998 | Davis et al. | |
| 5,988,051 A * | 11/1999 | Hashiguchi et al. ........... | 99/472 |
| 6,009,794 A | 1/2000 | Casey et al. | |
| 6,068,872 A * | 5/2000 | Hashiguchi et al. ......... | 426/438 |
| 6,202,543 B1 | 3/2001 | Moya et al. | |
| 6,254,790 B1 | 7/2001 | King et al. | |
| 2006/0130670 A1 | 6/2006 | Johnson et al. | |
| 2007/0012367 A1* | 1/2007 | Hotz et al. ................. | 137/556.3 |
| 2008/0121578 A1 | 5/2008 | Burkett et al. | |
| 2010/0116345 A1 | 5/2010 | Florkey et al. | |
| 2010/0300980 A1 | 12/2010 | Burkett et al. | |

* cited by examiner

*Primary Examiner* — Dana Ross
*Assistant Examiner* — Ayub Maye
(74) *Attorney, Agent, or Firm* — Wood Herron & Evans LLP

(57) ABSTRACT

A system for delivering a cooking medium of a cooking apparatus includes a cooking medium tank for storing the cooking medium and a rotary valve including a rotary inlet configured to be in fluid communication with the cooking medium tank. The rotary outlet further includes a plurality of rotary outlets including a first rotary outlet in fluid communication with a first cooking vessel and a second rotary outlet in fluid communication with a second cooking vessel. Moreover, the rotary valve is configured to selectively place the rotary inlet in fluid communication with one of the plurality of rotary outlets. In other embodiments, the system further includes a motor operatively connected to the rotary valve and configured to operate the rotary valve to select one of the plurality of rotary outlets.

12 Claims, 6 Drawing Sheets

| Position | Fryer Components |
|---|---|
| 1 | 1L |
| 2 | 1R or Full |
| 3 | 2L |
| 4 | 2R or Full |
| 5 | 3L |
| 6 | 3R or Full |
| 7 | 4L |
| 8 | 4R or Full |
| 9 | ATO Reservoir |
| 10 | Bulk Waste Oil Tank |

SELECTOR VALVE FOR SHORTENING MANAGEMENT SYSTEM

BACKGROUND OF THE INVENTION

1. Field of the Invention

The present application relates to systems and methods for supplying a cooking medium in a cooking apparatus, such as a fryer.

2. Description of Related Art

Known fryers, e.g., open-well fryers and pressure fryers, are used to cook various food products, e.g., poultry, fish, potato products, and the like. Such fryers may include one or more cooking vessels, e.g., fryer pots or fryer vats, which may be filled with a cooking medium, e.g., an oil, a liquid shortening, or a meltable-solid shortening. Such fryers also include a heating element, e.g., an electrical heating element, such as a heating oil medium, or a gas heating element, such as a gas burner and gas conveying tubes, which heat the cooking medium in the cooking vessel. The amount of time sufficient to cook or to complete the cooking of the food product at a given cooking temperature depends on the type of food product which is cooked. Moreover, the cooking medium may be used during several cooking cycles before the cooking medium inside the cooking vessel is filtered, replaced, or supplemented with a new or filtered supply of cooking medium.

Cooking medium may be filtered periodically to maintain cooking quality and to prolong the operational lifetime of the cooking medium. The filtering process removes cooking by-product, e.g., suspended food particles, ranging from dust-sized particles to larger pieces of crackling and small pieces of food product. Nevertheless, when this cooking medium is returned to the frypot, the filtering process may reduce the amount of cooking medium remaining in the frypot. If the amount of cooking medium drops below a predetermined level, then food that is cooked in the frypot may not be cooked completely or consistently, and the quality of food cooked in the fryer may diminish.

Referring to FIG. 1, a fryer apparatus 10 including a known manual cooking filtering system is depicted. Fryer apparatus 10 includes a frypot 16 having an open top 14 for receiving a food product. A cabinet 20, shown without a door for illustrative purposes, has brackets 32 supporting a drain pan 30 having a filter (not shown). Drain pan 30 includes a handle 34 that allows drain pan 30 to be removed from cabinet 20 for cleaning. Drain pan 30 is fluidly connected to frypot 16 via a drain line 24 and a filter pipe 28. A filter pump 27 is positioned on filter pipe 28, for drawing cooking medium into frypot 16 from pan 30. Frypot 16 includes a drain valve handle 22 that operates a drain valve (not shown) for selectively permitting cooking medium to drain from frypot 16 via drain line 24.

Frypot 16 also includes a filter valve handle 26 that operates a filter valve (not shown) for selectively permitting the introduction of cooking medium to frypot 16 from drain pan 30. In a system with multiple frypots, each frypot may be designated for cooking a different food product, e.g., chicken, "french-fried potatoes," and fish. The flavor characteristics of each of these food products may become infused to a greater or a lesser degree in the cooking medium. As a result, mixing cooking medium from frypots designated for different food products during filtering and replacement may adversely affect food quality, e.g., cooking chicken in a significant quantity of fish-flavored cooking medium may result in, e.g., "fish-flavored" chicken.

Some commercial pressure and open fryers include automated oil management systems which route oil through fryer subsystems to accomplish oil management tasks such as filtering and discarding used oil. To avoid mixing multiple types of cooking media in a vessel, known fryer systems use a system of plumbing, such as pumps, check valves, and solenoid valves to regulate the return of the cooking medium to the fryer from which the cooking medium was filtered. In known fryers, each cooking vessel may have its own corresponding pumps, check valves, and solenoid valves. In some systems, as many as eight frypots are included in each fryer. These additional parts cause the fryer to take up a larger space than what otherwise would be necessary. Further, the additional piping and cooking medium routing elements require more cooking medium than otherwise would be necessary.

Known fryers may have a large cooking capacity, and may require many liters of cooking medium in order to properly cook the various food products. Therefore, known fryers often are operated with less expensive cooking media, e.g., vegetable and corn cooking medium. Nevertheless, in recent years, as demand for food cooked in other mediums increases, food suppliers have begun to replace less expensive cooking media with more expensive cooking media. One such change is the recent demand for cooking media with zero trans fats. This type of cooking medium may be more expensive than other known cooking media, and it may be desirable to have a system that uses a reduced volume of cooking medium. Moreover, it may be desirable to provide a system that includes a greater number of individual frypots for cooking different types of foods. Therefore, it may be desirable to reduce the amount of space required to house the components of the fryer.

SUMMARY OF THE INVENTION

Therefore, a need has arisen for systems and methods for a cooking apparatus that overcomes these and other shortcomings of the related art. A technical advantage of the present invention is that multiple solenoid valves may be replaced by a single rotary valve and may reduce the size and complexity of the fryer, improve performance, and/or reduce cost of automatic filtration systems.

In an embodiment of the invention, a system for delivering a cooking medium of a cooking apparatus includes a cooking medium tank for storing the cooking medium and a rotary valve including a rotary inlet configured to be in fluid communication with the cooking medium tank. The rotary outlet further includes a plurality of rotary outlets including a first rotary outlet in fluid communication with a first cooking vessel and a second rotary outlet in fluid communication with a second cooking vessel. Moreover, the rotary valve is configured to selectively place the rotary inlet in fluid communication with one of the plurality of rotary outlets. In other embodiments, the system further includes a motor operatively connected to the rotary valve and configured to operate the rotary valve to select one of the plurality of rotary outlets. In yet other embodiments, the system includes a manual crank operatively connected to the rotary valve and configured to operate the rotary valve to selectively place the rotary inlet in fluid communication with one of the plurality of rotary outlets.

In another embodiment of the invention, where a cooking apparatus includes a cooking vessel in fluid communication with a rotary valve and a cooking medium tank in fluid communication with the rotary valve, a method for delivering a cooking medium to the cooking apparatus includes the steps of activating a rotary valve motor operatively coupled to the rotary valve, deactivating the rotary valve motor when the cooking vessel and the cooking medium tank are in fluid communication, and transferring the cooking medium from the cooking medium tank to the cooking vessel.

In yet another embodiment of the invention, a system for delivering a cooking medium of a cooking apparatus includes a cooking medium tank for storing the cooking medium, a filter tank for storing filtered cooking medium, a rotary valve, a motor operatively connected to the rotary valve, and a controller configured to control the motor. The rotary valve includes a rotary inlet configured to be in fluid communication with the cooking medium tank and the filter tank, and a plurality of rotary outlets, which include a first rotary outlet in fluid communication with a first cooking vessel, a second rotary outlet in fluid communication with a second cooking vessel, and a cooking medium tank rotary outlet in fluid communication with the cooking medium tank. Further, the rotary valve is configured to selectively place the rotary inlet in fluid communication with one of the plurality of rotary outlets.

Other objects, features, and advantages of the present invention will be apparent to persons of ordinary skill in the art in view of the foregoing detailed description of the invention and the accompanying drawings.

BRIEF DESCRIPTION OF THE DRAWINGS

For a more complete understanding of the present invention, needs satisfied thereby, and objects, features, and advantages thereof, reference now is made to the following description taken in connection with the accompanying drawings.

DETAILED DESCRIPTION OF EMBODIMENTS OF THE INVENTION

Preferred embodiments of the present invention, and their features and advantages, may be understood by referring to FIGS. 2-6, like numerals being used for corresponding parts in the various drawings.

Figure 1:
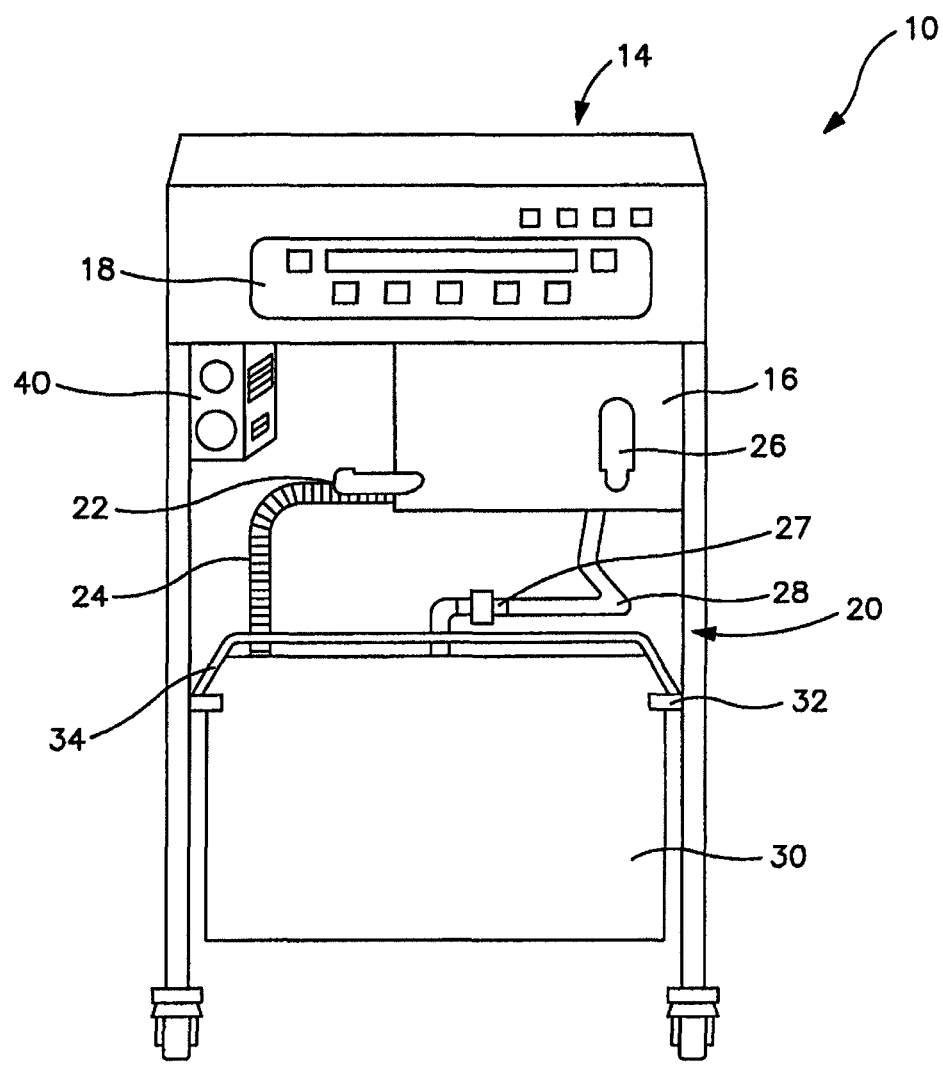
FIG. 1 is a front view of a known fryer apparatus.
Figure 2:
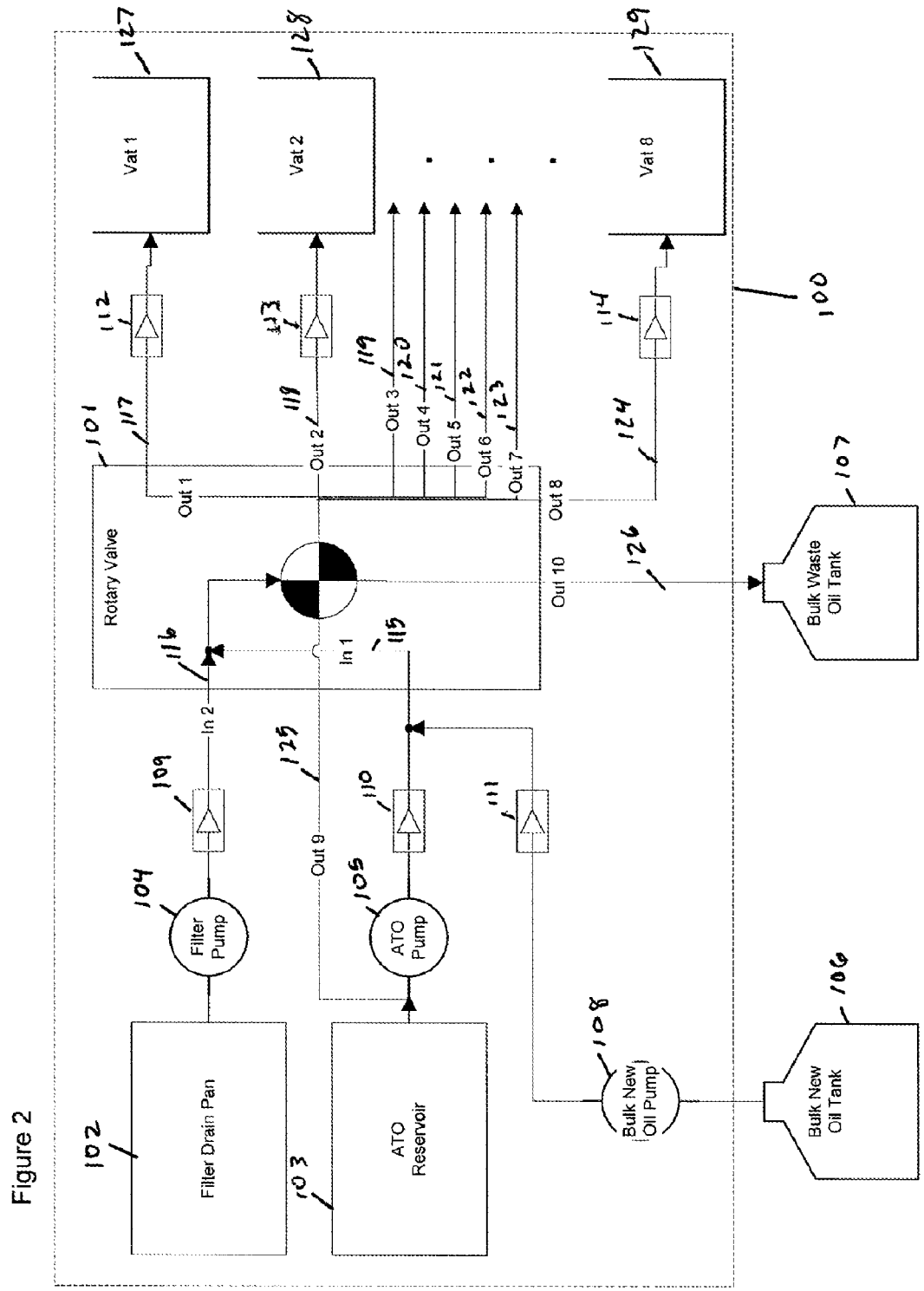
FIG. 2 is a schematic view of a cooking medium system using a rotary valve, according to an embodiment of the invention.

FIG. 2 shows a cooking medium system using a rotary valve, such as a fryer apparatus 100, according to an embodiment of the present invention. Fryer apparatus 100 may comprise at least one cooking vessel 127, e.g., a frypot, fryer pot, or fryer vat, which may be configured to hold a cooking medium, e.g., an oil, a liquid shortening, a meltable-solid shortening, or the like. Fryer apparatus 100 also may comprise a plurality of cooking vessels 127, 128 and 129, e.g., eight cooking vessels. Cooking vessel 127 may have an opening (not shown) for receiving a food product. A heating element (not shown), e.g., a heating oil medium, a gas jet, or the like, may be positioned within cooking vessel 127. The heating element may apply heat to the cooking medium within vessel 127 until the cooking medium reaches a predetermined temperature, and also may apply heat to maintain the cooking medium within vessel 127 at a predetermined temperature. Fryer apparatus 100 may be configured for use in a gas or electric fryer apparatus. Although vessel 127 may be suitable for an open-well fryer, cooking medium system 100 also may be used in a pressure fryer. Each of pipes 115-126 may incorporate a check valve 109-114. Check valves 109-114 may be configured to open if a pump provides a sufficient pressure.

Figure 3:
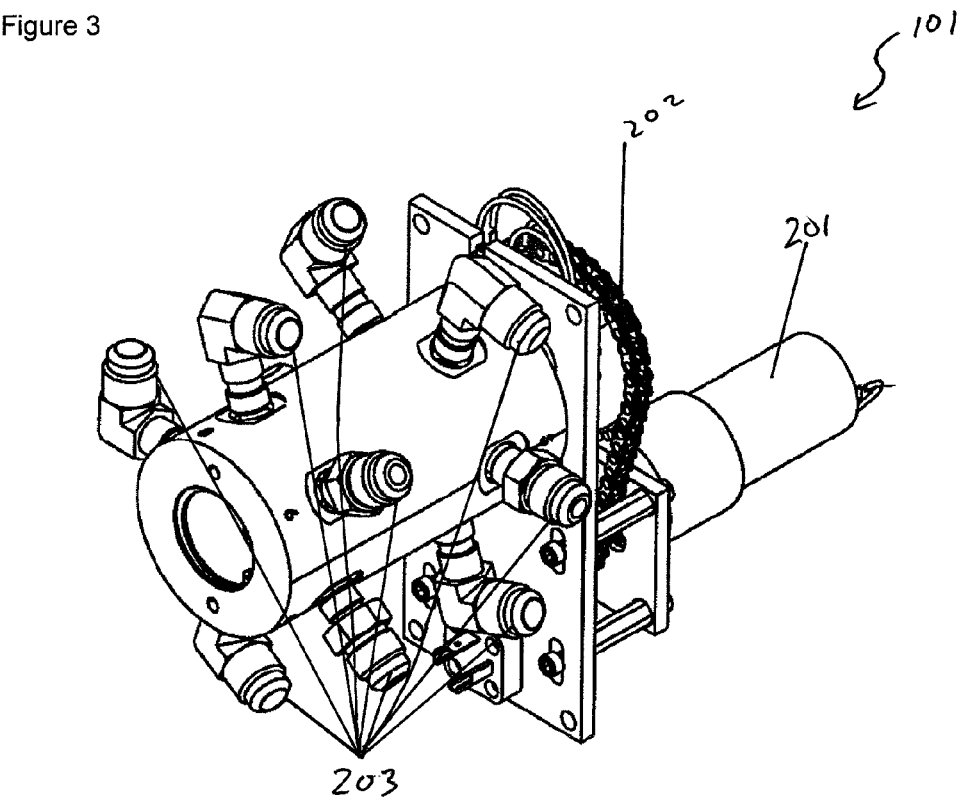
FIG. 3 depicts a rotary valve assembly, according to an embodiment of the invention.
Figure 3:
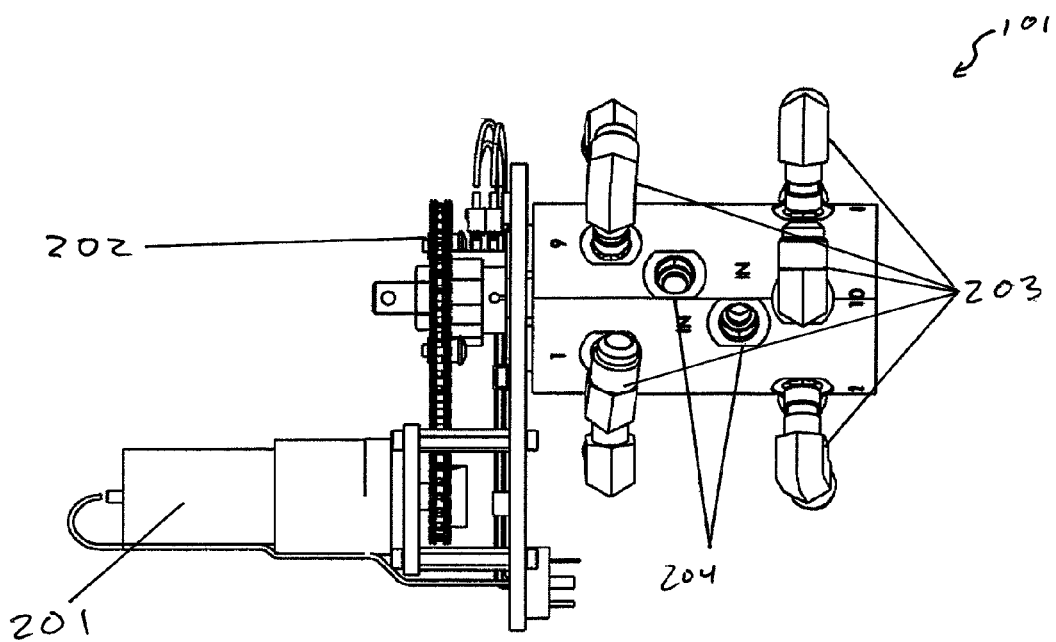
Figure 4:
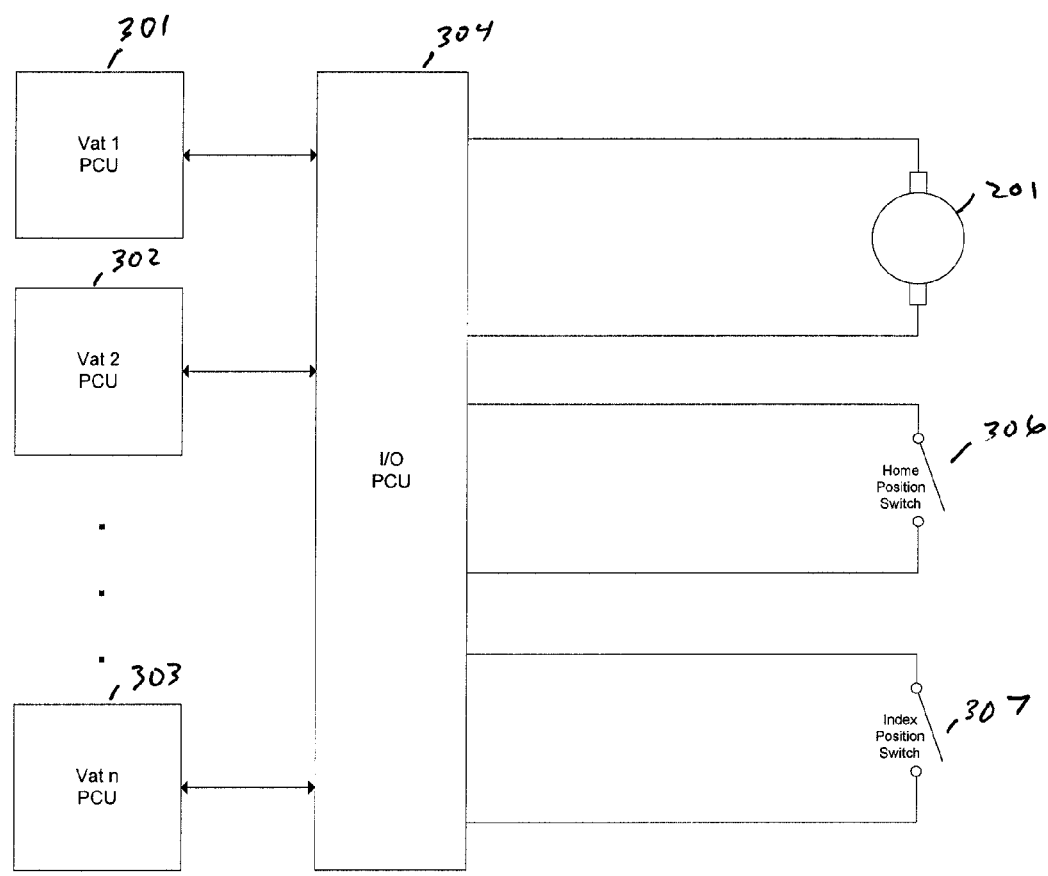
FIG. 4 depicts a fryer process control arrangement, according to an embodiment of the invention.

FIG. 3 depicts rotary valve 101. Rotary valve 101 may include a stationary hollow outer cylinder with one or more fluid inlet ports 204 and one or more fluid outlet ports 203. Inlet ports 204 may be selectable or may converge to form a single inlet. Additionally, rotary valve 101 may be configured with a rotating inner cylinder (not shown in FIG. 3) with channels to coincide with different outlet ports 203 as the inner cylinder rotates. As such, rotary valve 101 may be operated to selectively connect one or more inlet ports 204 with one or more outlet ports 203. The inner cylinder may be rotated by a motor 201, e.g., a direct current (DC) motor. Additionally, the inner cylinder may be rotated by a solenoid engaging a cam, a stepper motor, or any other mechanism to rotate the inner cylinder. Further, the inner cylinder may be operated manually, e.g., with a crank and handle for turning. The motor may be operatively coupled to the inner cylinder by a transmission 202, e.g., a system of gears, chains, and/or belts. As the inner cylinder is rotated, one or more of outputs 203 may be selected and placed in fluid communication with one or more inputs 204. Rotary valve 101 also may include cams (not shown) on the inner cylinder drive shaft. The cams may indicate the position of the inner cylinder and may actuate a home position switch 306 and index position switch 307, as depicted in FIG. 4.

As depicted in FIG. 2, rotary valve 101 may connect the oil management subsystems of the fryer through pipes 115-126. Pipes 115-126 may be rigid or may be of flexible corrugated construction. In this embodiment, rotary valve 101 has two inlet ports 204 corresponding to pipes 115 and 116 and ten outlet ports 203 corresponding to pipes 117-126. Two inlet ports 204 may be connected internally within rotary valve 101.

One inlet port corresponding to pipe 115 may connect to ATO (auto top-off) reservoir 103 and bulk new oil tank 106. ATO reservoir 103 may be a container of oil internal to fryer 100 which stores new oil. This oil may be pumped to each cooking vessel 127-129 as needed by ATO Pump 105 to replenish oil which is removed by the fried food product. Bulk new oil tank 106 may be located external to fryer 100. Bulk new oil from bulk new oil tank 106 may be pumped by Bulk New Oil Pump 108 and used to fill ATO reservoir 103, to fill cooking vessels 127-129 when a new fryer 100 is installed, and to fill cooking vessels 127-129 when used oil is discarded.

The other inlet port 204 corresponding to pipe 116 may connect to the outlet of filter drain pan 102. Further, cooking vessel 127 may drain into filter drain pan 102. Filter drain pan 102 may be a container, e.g., a drain pan or a filter canister. Draining into filter drain pan 102 may be controlled by a controller 304. Cooking medium may pass into filter drain pan 102, where it may be stored as recycled cooking medium. The cooking medium may then be pumped by filter pump 104 into one of cooking vessels 127-129, into ATO reservoir 102, or into bulk waste oil tank 107.

In one embodiment, up to eight of the ten outlet ports 203 may be connected to cooking vessels 127-129. The ninth outlet port 203 may connect to ATO reservoir 103, and the tenth outlet port may connect to bulk oil waste tank 107. Bulk oil waste tank 107 may be external to fryer 100, and may store used oil for eventual discard.

The number of input ports 204 and output ports 203 may be adjusted to accommodate different oil management systems and varying numbers of cooking vessels 127-129 in a fryer 100. Moreover, unused ports may be plugged. Some fryers may not include all oil management subsystems. For example, some fryers might not be connected to a bulk new oil tank 106, or to a bulk waste oil tank 107. Some fryers may not have an ATO reservoir 103. In those embodiments, appropriate fluid inlet ports 204 and outlet ports 203 may be plugged.

In conventional systems, a fryer assembly may consist of one to five wells. Each well may contain one full vat (or cooking vessel), or two split vats. The oil volume of a split vat may be approximately one-half that of a full vat. Different vat configurations may enable the equipment operator to cook different menu food items in vats specifically configured for that item. For example, "french-fried potatoes" may be cooked in a full vat because large volumes may be prepared. "Chicken nuggets" may be cooked in a split vat because the load size may be smaller, the demand may be less, and the temperature setpoint may be different. Split and full-vat wells may be mixed in a single fryer frame. For example, a four-well fryer may have all full vats, denoted as FFFF. A four-well fryer may have all splits vats, denoted SSSS. The FFFF fryer has a total of four vats, and the SSSS fryer has a total of eight vats. A four-well fryer also may be configured with two full vats and two split vats (FFSS), for a total of six vats. Each vat PCU (process control unit) 301-303 may control one well: either one full vat or two split vats. If the well is a split vat, then the two vats may be designated "left" and "right."

FIG. 4 depicts a schematic representation of the process control arrangement in fryer 100. Vat PCUs 301-303 may regulate the frying operations for one or two vats, depending on whether or not that vat assembly is a full-vat or a split-vat. Each of vat PCUs 301-303 may communicate with fryer 100 I/O PCU 304, which in turn may monitor position switches 306 and 307 and control rotary valve 101 by energizing motor 201.

Figure 5:
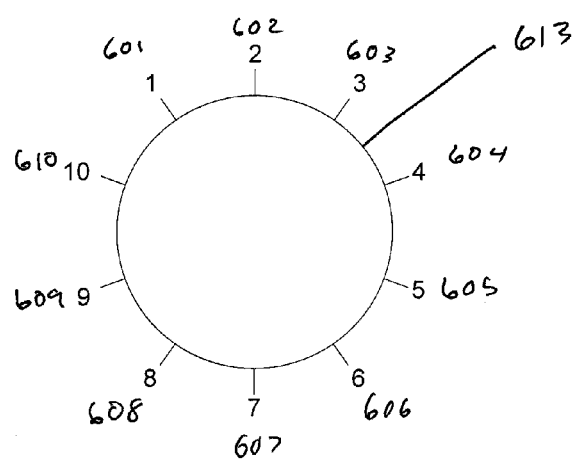
FIG. 5 depicts a set of positions within a rotary valve, according to an embodiment of the invention.

FIG. 5 depicts a set of positions of an inner cylinder within a rotary valve, according to an embodiment of the invention. An inner cylinder 613 of a rotary valve 101 may be provided in a fryer 100 containing four wells. Inner cylinder 613 may rotate to at least ten discrete positions 611. Each position 611 may correspond with an outlet port 203 of rotary valve 101. Because each outlet port 203 may be connected to a component of fryer 100, e.g., a cooking vessel 127-129, a bulk waste oil tank 107, or an ATO reservoir 103, positions 611 of inner cylinder 613 may be mapped to a specific component 612 of fryer 100. In table 600 positions 611 are mapped to specific components 612 of fryer 100. For example, when inner cylinder 613 is in first position 601, inlet ports 204 may be in fluid communication with the left vat of the first well of fryer 100. Similarly, when inner cylinder 613 is in sixth position 606, inlet ports 204 may be in fluid communication with the right vat of the third well. In some embodiments, tenth position 610 of inner cylinder 613 may correspond to bulk waste oil tank 107 and also may be the "home" or default position of rotary valve 101.

When a Vat PCU 301-303 performs an oil management task, it sends a request to I/O PCU 304. That request may be formatted such as: "move the rotary valve to position n," where "n" is the desired outlet port 203 position. I/O PCU 304 may execute the request unless rotary valve 101 is already in use by another cooking vessel 127-129.

Examples of specific oil management tasks are: (1) Auto-top off (ATO) pulses, requesting an injection of oil from ATO reservoir 103 into cooking vessel 127-129 to bring the oil up to the correct level; (2) Fill ATO reservoir 103 from bulk new oil tank 106; (3) Fill cooking vessel 127-129 from filter drain pan 102, by requesting oil from drain pan 102 be pumped to cooking vessel 127-129 during the oil filter process; (4) Fill cooking vessel 127-129 from bulk new oil tank 106; and (5) Discard used oil to bulk oil waste tank 107, by draining it from cooking vessel 127-129 to filter drain pan 102, then pumping it to bulk oil waste tank 107.

Figure 6:
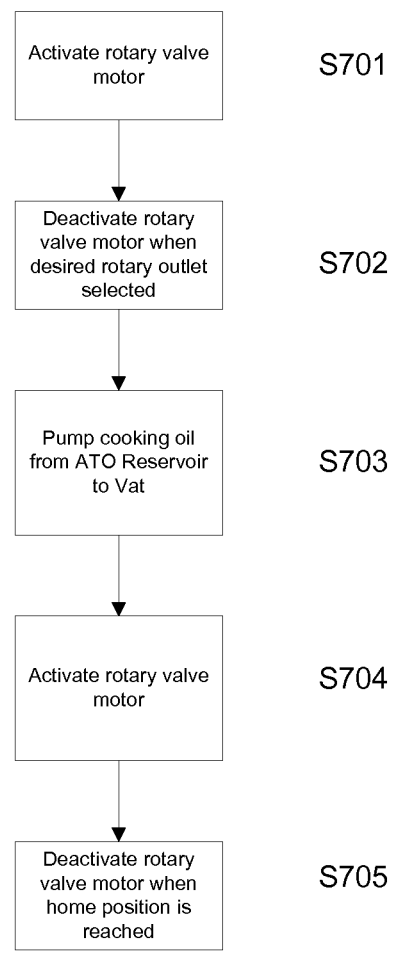
FIG. 6 depicts a method of filling a vat, according to an embodiment of the invention.

In some embodiments, as depicted in FIG. 6, to perform an ATO pulse to fill a cooking vessel, e.g. Vat 1 (127), a corresponding Vat PCU, e.g., Vat 1 PCU 301, may request I/O PCU 304 to move rotary valve 101 to first position 601. If rotary valve 101 is not in use, I/O PCU 304 may activate motor 201 to rotate inner cylinder 613 to desired position, e.g. first position 601 (S701). Motor 201 can deactivate when the desired position, e.g. first position 601, is reached (S702). ATO Pump 105 may then be engaged by I/O PCU 304 to begin pumping cooking oil from ATO Reservoir (S703). If the pressure behind check valve 110 reaches a predetermined threshold, check valve 110 may open and allow cooking medium stored in ATO reservoir 103 to flow into rotary valve 101. Because inner cylinder 613 was rotated to first position 601, the cooking medium may continue to flow through pipe 117 toward Vat 1 (127). If the pressure in pipe 117 reaches a predetermined threshold, check valve 112 may open and allow cooking medium to flow into Vat 1 (127). ATO Pump 105 may pulse cooking oil into Vat 1 (127) until the cooking oil level in Vat 1 (127) reaches a desired level. I/O PCU 304 may then turn off ATO pump 105. I/O PCU 304 may wait a predetermined period after turning off ATO pump 105 and then may activate motor 201 to rotate inner cylinder 613 to home position 610 (S704) and deactivate motor 201 when home position 610 is reached (S705).

As described above, in some embodiments ATO reservoir 103 may be filled from bulk new oil tank 106. To fill ATO reservoir 103, if rotary valve 101 is not in use, I/O PCU 304 may engage motor 201 to rotate inner cylinder 613 to ninth position 609, corresponding to ATO reservoir 103. Bulk new oil pump 108 may then be engaged by I/O PCU 304. If the pressure behind check valve 111 reaches a predetermined threshold, check valve 111 may open and allow cooking medium stored in bulk new oil tank 106 to flow into rotary valve 101. Because inner cylinder 613 was rotated to ninth position 609, the cooking medium may continue to flow through pipe 120 toward ATO Reservoir 103. Bulk new oil pump 108 may pulse cooking oil into ATO Reservoir 103 until the cooking oil level in ATO Reservoir 103 reaches a desired level. I/O PCU 304 may then turn off bulk new oil pump 108. I/O PCU 304 may wait a predetermined period after turning off bulk new oil pump 108 and then may rotate inner cylinder 613 to home position 610.

As described above, in some embodiments a cooking vessel 127-129 may be filled from filter drain pan 102. To fill a cooking vessel, e.g. Vat 1 (127), from filter drain pan 102, a corresponding Vat PCU, e.g., Vat 1 PCU 301, may request I/O PCU 304 to move rotary valve 101 to first position 601. If rotary valve 101 is not in use, I/O PCU 304 may engage motor 201 to rotate inner cylinder 613 to first position 601. Filter pump 104 may then be engaged by I/O PCU 304. If the pressure behind check valve 109 reaches a predetermined threshold, check valve 109 may open and allow cooking medium stored in filter drain pan 102 to flow into rotary valve 101. Because inner cylinder 613 was rotated to first position 601, the cooking medium may continue to flow through pipe 117 toward Vat 1 (127). If the pressure in pipe 117 reaches a predetermined threshold, check valve 112 may open and allow cooking medium to flow into Vat 1 (127). Filter pump 104 may pulse cooking oil into Vat 1 (127) until the cooking oil level in Vat 1 (127) reaches a desired level. I/O PCU 304 may then turn off filter pump 104. I/O PCU 304 may wait a predetermined period after turning off filter pump 104 and then may rotate inner cylinder 613 to home position 610.

As described above, in some embodiments a cooking vessel 127-129 may be filled from bulk new oil tank 106. To fill a cooking vessel, e.g. Vat 1 (127), from bulk new oil tank 106, a corresponding Vat PCU, e.g., Vat 1 PCU 301, may request I/O PCU 304 to move rotary valve 101 to first position 601. If rotary valve 101 is not in use, I/O PCU 304 may engage motor 201 to rotate inner cylinder 613 to first position 601. Bulk new oil pump 108 may then be engaged by I/O PCU 304. If the pressure behind check valve 111 reaches a predetermined threshold, check valve 111 may open and allow cooking medium stored in bulk new oil tank 106 to flow into rotary valve 101. Because inner cylinder 613 was rotated to first position 601, the cooking medium may continue to flow through pipe 117 toward Vat 1 (127). If the pressure in pipe 117 reaches a predetermined threshold, check valve 112 may open and allow cooking medium to flow into Vat 1 (127). Bulk new oil pump 108 may pulse cooking oil into Vat 1 (127) until the cooking oil level in Vat 1 (127) reaches a desired level. I/O PCU 304 may then turn off bulk new oil pump 108. I/O PCU 304 may wait a predetermined period after turning off bulk new oil pump 108 and then may rotate inner cylinder 613 to home position 610.

As described above, in some embodiments, used oil may be discarded to bulk oil waste tank 107. To discard oil, oil may be drained from a cooking vessel 127-129, e.g., Vat 1 (127), by draining it from cooking vessel 127 to filter drain pan 102. If rotary valve 101 is not in use, I/O PCU 304 may engage motor 201 to rotate inner cylinder 613 to tenth position 610. Tenth position 610 may already be selected because it is the home position. Filter pump 104 may then be engaged by I/O PCU 304. If the pressure behind check valve 109 reaches a predetermined threshold, check valve 109 may open and allow cooking medium stored in filter drain pan 102 to flow into rotary valve 101. Because inner cylinder 613 was rotated to tenth position 610, the cooking medium may continue to flow through pipe 121 toward bulk waste oil tank 107. Filter pump 104 may pulse cooking oil into bulk waste oil tank 107 until filter drain pan 102 is empty. I/O PCU 304 may then turn off filter pump 104.

Rotary valve 101 may be controlled in one of four states: normal, fall-back, calibrate and failed. In the normal state, both cam switches 306 and 307 are operational. In the fall-back state, index switch 307 may have failed and rotary valve 101 may be positioned based on home switch 306. The calibrate state may be used to acquire timing values for the fall-back state. In the failed state, I/O PCU 304 may fail to detect closures from both switches 306 and 307, and may block any oil management tasks.

In normal mode, I/O PCU 304 has determined that both cam switches 306 and 307 are operational, such that the index cam may be used to position rotary valve 101. In one embodiment, the default position is the "home" position (position 10). Thus, I/O PCU 304 positions rotary valve 101 at the requested position by counting index switch 306 transitions until the cam is at the required position. For example, if a Vat PCU 301-303 requests index position 4 604, then I/O PCU 304 energizes motor 201 to rotate valve 101 through positions 1 601, 2 602 and 3 603, then de-energizes motor 201 when index switch 306 asserts at position 4 604. Motor 201 is de-energized until Vat PCU 301-303 relinquishes rotary valve 101 control, then I/O PCU 304 returns rotary valve 101 to the home position 610.

Valve inner cylinder 613 may be aligned so that position switches 307 assert when inlet 204 and outlet 203 ports are aligned. In such an embodiment, I/O PCU 304 may de-energize motor 201 when index position switch 307 asserts. Nevertheless, the ports 203 may misalign if motor 201 and valve inertia cause inner cylinder 613 to coast past the aligned position. For this reason electric braking may be used to reduce coasting. Electric braking is known in the art, and consists of shorting motor 201 power leads after power is removed. This may cause motor 201 armature current and torque to reverse and quickly drive the armature velocity towards zero.

In some embodiments, the home position 610 corresponds with valve outlet port 10, which may connect to pipe 126, which is plumbed to bulk waste oil tank 107. In this way, if a system fault causes a pump to energize unintentionally, then the oil, if any, will be pumped into waste oil tank 107. Other home positions may result in oil being pumped into a cooking vessel 127-129, which could overflow to the floor, or into ATO reservoir 103, which might also overflow to the floor. This assignment of home to valve outlet port 10 also may prevent deadheads, since it may always be possible to pump into waste oil tank 107. Nevertheless, not all businesses have a bulk oil waste tank. In this case valve outlet 10 may be plugged.

Faults in the position indication system may be detected in the following manner. If motor 201 is energized for 20 seconds and home switch input 306 does not register the expected transitions from asserted to not-asserted, and not-asserted to asserted, then home switch input 306, or the connection with I/O PCU 304, may be considered to have failed. If index position switch 307 does not indicate "n" transitions during a complete rotation cycle, where "n" is the number of valve positions, then index position switch 307, or the connection with I/O PCU 304, may be considered to have failed.

In the fall-back state, a fault is considered to have occurred such that index switch 307 transitions are not communicated to I/O PCU 304. These faults include switch failure, wiring or connector failure and index cam wear. If home switch 306 signal is still operational, I/O PCU 304 may detect index switch 307 failure and revert to fall-back operation. In this state, rotary valve 101 is indexed by energizing motor 201, from the home position, for a time duration calculated to position rotary valve 101 at the required position. This time duration may be determined in calibration mode.

In calibration mode I/O PCU 304 may measure the rotation time for a complete cycle between two home switch assertions. The rotation time may be measured beginning with motor 201 off, to include the start-up acceleration time of rotary valve 101 in the final calculation. When subsequent valve positioning is needed, I/O PCU 304 may energize motor 201 for the time duration calculated to place rotary valve 101 at the required position. For example, if the total cycle time is about 2.2 seconds and there are 10 positions, then the time/position may be about 2.2/10=0.22 seconds. To place rotary valve 101 at the second index position from the home position, I/O PCU 304 may energize motor 201 for about 2×0.22=0.44 seconds.

In the failed mode I/O PCU 304 may detect no transitions from home 306 or index switch 307, so rotary valve 101 position is unknown, and rotary valve 101 cannot be positioned. I/O PCU 304 may de-energize pumps 104, 105 and 108 and may block requests for any oil management tasks. In failed mode the manual over-ride may be used to position rotary valve 101.

In some embodiments rotary valve 101 may provide a mechanical connection (not shown) for a manual override. The manual override may consist of a handle or crank and visible index markings. If rotary valve motor 201 or position sensors 306 and 307 fail, the operator may manually move rotary valve 101 to a particular port position, and so accomplish oil management tasks until repairs are made.

In another embodiment, the two position sense cams and switches 306 and 307 may be replaced with a single cam and switch to reduce cost. The lobes of the single cam may vary in width and the width of at least one lobe may differ significantly from the others to provide a reference indication. Moreover, in other embodiments, the home and index cams may be identical. One lobe on each cam may indicate the home position by a unique dwell time, either longer or shorter than the other lobes. In yet further embodiments, lobes on the position cams may be symmetrical, and the inner cylinder aligned with the cam lobe such that ports 203 and 204 align when switch 306 is at the lobe center. In this embodiment, a calibration mode may measure the switch dwell time (Tdwell) and deenergize motor 201 at Tdwell/2, to place the switch roller at the peak of the cam lobe. This may result in more accurate positioning over the life of the valve, because the switch roller diameter will decrease from wear but motor 201 will still stop with the roller at the lobe peak. Position accuracy may be further improved if the coast is quantified; then motor 201 may be de-energized slightly before the desired stop position.

In some embodiments, home and index switches 306 and 307 may be implemented as SPDT switches. These switches have three terminals: common, normally open (NO) and normally closed (NC). Wiring error may result in accidental connection to the NC instead of the NO contacts. In some embodiments, the PCU may detect this mistake because the dwell timing may be inverted. The PCU may then compensate for the wiring error.

In some embodiments, a pressure transducer may be used to monitor the pressure when a pump 104, 105, or 108 is running. If an excess pressure is detected, it may suggest misalignment of the inner and outer valve cylinders. Corrective measures may then be taken.

In some embodiments, fryer 100 may be connected to an in-store network. In such an embodiment, fryer 100 may report failures to a service organization for faster repair.

The disclosed subject matter and methods may be implemented in software stored on computer readable storage media, such as a hard disk, flash disk, magnetic tape, optical disk, network drive, or other computer readable medium. The software may be performed by a processor capable of reading the stored software and carrying out the instructions therein, whether remotely over a network or locally. The disclosed subject matter and methods also may be implemented in hardware, e.g., a chip specifically fabricated for the purpose of the disclosed subject matter.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

The invention claimed is:

1. A system for delivering a cooking medium of a cooking apparatus, comprising:
   a cooking medium tank for storing the cooking medium; and
   a rotary valve comprising a rotary inlet configured to be in fluid communication with the cooking medium tank and a plurality of rotary outlets comprising a first rotary outlet in fluid communication with a first cooking vessel and a second rotary outlet in fluid communication with a second cooking vessel,
   wherein the rotary valve is configured to selectively place the rotary inlet in fluid communication with one of the plurality of rotary outlets.

2. The system of claim 1, further comprising a motor operatively connected to the rotary valve and configured to operate the rotary valve to select one of the plurality of rotary outlets.

3. The system of claim 2, further comprising a manual crank operatively connected to the rotary valve and configured to operate the rotary valve to selectively place the rotary inlet in fluid communication with one of the plurality of rotary outlets.

4. A method for delivering a cooking medium to a cooking apparatus comprising a cooking vessel in fluid communication with a rotary valve comprising a rotary inlet and a plurality of rotary outlets, and a cooking medium tank in fluid communication with the rotary valve, the method comprising the steps of:
   activating a rotary valve motor operatively coupled to the rotary valve;
   deactivating the rotary valve motor when the cooking vessel and the cooking medium tank are in fluid communication via the rotary inlet and at least one of the plurality of rotary outlets; and
   transferring the cooking medium from the cooking medium tank to the cooking vessel.

5. A system for delivering a cooking medium of a cooking apparatus, comprising:
   a cooking medium tank for storing the cooking medium;
   a filter tank for storing filtered cooking medium;
   a rotary valve comprising:
      a rotary inlet configured to be in fluid communication with the cooking medium tank and the filter tank, and
      a plurality of rotary outlets comprising:
         a first rotary outlet in fluid communication with a first cooking vessel,
         a second rotary outlet in fluid communication with a second cooking vessel, and
         a cooking medium tank rotary outlet in fluid communication with the cooking medium tank;
   a motor operatively connected to the rotary valve; and
   a controller configured to control the motor,
   wherein the rotary valve is configured to selectively place the rotary inlet in fluid communication with one of the plurality of rotary outlets.

6. The system of claim 5 further comprising a manual crank operatively connected to the rotary valve and configured to operate the rotary valve to selectively place the rotary inlet in fluid communication with one of the plurality of rotary outlets.

7. The system of claim 5, wherein the rotary valve further comprises a home position indicator configured to indicate that the rotary inlet is in fluid communication with a home position outlet; and
an index position indicator configured to indicate that the rotary inlet is in fluid communication with a particular rotary outlet.

8. The system of claim 7, wherein
an index number is associated with each of the plurality of rotary outlets, and each index number corresponds to a position of the corresponding rotary outlet relative to the home position outlet;
the controller is configured to operate the motor for a particular period of time to place the rotary inlet in fluid communication with the home position outlet and operate the motor for a further period of time to place the rotary inlet in fluid communication with the particular rotary outlet;
the further period of time is substantially equal to a full cycle time divided by a total number of the plurality of rotary outlets multiplied by the index number of the particular rotary outlet; and
the full cycle time is substantially equal to an amount of time required to operate the motor through one complete rotation of the rotary valve.

9. The system of claim 7, wherein
the home position indicator comprises a home position switch,
the index position indicator comprises an index position switch, and
the rotary valve further comprises:
a home cam configured to activate the home position switch and
an index cam configured to activate the index position switch.

10. The system of claim 7, wherein the filter tank is in fluid communication with the first cooking vessel and the second cooking vessel, the system further comprising:

a cooking medium tank pump positioned between the cooking medium tank and the rotary inlet and configured to convey cooking medium; and
a filter pump positioned between the filter tank and the rotary inlet and configured to convey filtered cooking medium.

11. The system of claim 10 further comprising:
a bulk new cooking medium tank, for storing cooking medium, in fluid communication with the rotary inlet;
a bulk new cooking medium pump positioned between the bulk new oil tank and the rotary inlet and configured to convey cooking medium;
a bulk new cooking medium tank check valve positioned between the bulk new cooking medium tank pump and the rotary inlet and configured to selectively permit cooking medium to flow from the bulk new cooking medium tank pump to the rotary inlet; and
a waste tank for storing waste cooking medium, wherein the plurality of rotary outlets further comprises a waste tank rotary outlet in fluid communication with the waste tank and wherein the home position outlet is the waste tank rotary outlet.

12. The system of claim 10 further comprising:
a filter pump check valve positioned between the filter pump and the rotary inlet and configured to selectively permit cooking medium to flow from the filter pump to the rotary inlet;
a cooking medium tank check valve positioned between the cooking medium tank pump and the rotary inlet and configured to selectively permit cooking medium to flow from the cooking medium tank pump to the rotary inlet;
a first cooking vessel check valve positioned between the first rotary outlet and the first cooking vessel and configured to selectively permit cooking medium to flow from the first rotary outlet to the first cooking vessel; and
a second cooking vessel check valve positioned between the second rotary outlet and the second cooking vessel and configured to selectively permit cooking medium to flow from the second rotary outlet to the second cooking vessel.

* * * * *